Oct. 4, 1955    K. SEIFERT    2,719,688
TELESCOPIC TUBES
Filed Feb. 18, 1950

Inventor:
Karl Seifert

By Michael S. Striker, Agt.

United States Patent Office 2,719,688
Patented Oct. 4, 1955

2,719,688

TELESCOPIC TUBES

Karl Seifert, Ludenscheid, Westphalia, Germany

Application February 18, 1950, Serial No. 144,993

12 Claims. (Cl. 248—191)

This invention relates to telescopic tubes, more particularly for photographic and the like tripod stands, but also applicable for other purposes, for example for display appliances such as hat stands and the like, and for vehicle aerials. The invention is concerned with telescopic tubes of the type in which the inner ends of the telescoping tube sections are provided with enlarged sleeves which abut against constrictions on the surrounding tube sections when the tube is extended.

In order to keep its collapsed length as small as possible for a given extended length, the telescopic tube must be made up from a plurality of sections. The diameter of the outermost section increases with the number of collapsible sections, so that the tripod stand or the like becomes bulkier the smaller is its collapsed length. Moreover, in order to keep the thickness as small as possible, on the one hand, tubes of small wall-thickness, for example, 0.35 mm. are used, and on the other hand, there is only a slight difference in the diameters of the enlarged sleeves and of the constrictions, as compared with those of the appropriate tube sections, so that the shoulders which limit the extensions of the tube are very shallow, being for example, only 0.2 mm. in depth. In these circumstances, through the employment of unnecessarily great force in extending the tube, it may happen that the enlarged end of one or other of the thin-walled tube sections gives way internally under the applied pressure, so that the sleeve constricts somewhat and slides through the constricted end portion of the surrounding tube section and the collapsible tube is pulled apart.

A further disadvantage resides in the fact that in forcibly closing the tube the thin-walled inner ends of the telescoping tube sections are compressed together by the stop-cams, slide over them and impinge against the detent-pins which are located in the enlarged sleeves to lock the tube-sections to one another, ejecting said pins from the apertures in the sleeve walls in which they are carried. In consequence of this not merely is the locking device rendered inoperative at one place, but the pins now adrift in the interior of the tube sections cause trouble and can in the case of tripod-stands with multipartite legs, render an entire leg useless.

The invention aims at obviating the foregoing disadvantages and at providing a telescopic tube of the aforementioned type in which trouble or damage cannot occur even with clumsy handling. To this end, according to the invention the walls of the enlarged sleeves provided at the inner ends of the telescoping tube sections are supported internally by transverse walls or partitions arranged therein.

In the first place with the construction of the invention it can no longer happen that on impinging against the constrictions in the surrounding sections the enlarged ends of the tube sections yield inwardly and slip through said constrictions. They are, on the contrary, stiffened by the transverse walls and kept in shape, so that the extent to which the tube can be pulled out is limited positively by the shoulders formed by the sleeves and constrictions and it is impossible to pull the telescopic tube apart. The walls of the enlarged sleeves are most effectively supported by locating the partitions near the shoulders formed by the enlargements so that the support acts directly at the impact points of the sleeves. In some cases the partitions may also be located at other points of the enlarged sleeves, for example near the edge or rim of the sleeve. It is also possible to arrange two partitions in each sleeve, one at the shoulder and the other at the rim.

A further consequence of the new arrangement is that the interior of the telescopic tube is subdivided into a number of chambers corresponding to the number of tube sections and separated from one another by the partitions. This affords the advantage that any detent pin dislodged or knocked out of its guide holes can only move in the interior of a single tube section, that is, in a space closed at both ends by partitions, which contains no pins other than that which has come adrift. If each sleeve contains two partitions, then the mobility of each pair of pins is even limited to the cavity of the appropriate sleeve, or it may even happen that the two partitions preclude the knocking out of the pin at all. In any event any pins dislodged are kept away from the other detent pins of the telescopic tube, so that any blocking or obstruction of the tube or of the leg of a tripod stand by dislodged pins is prevented. It may indeed happen that there is no locking means at one point. However, the telescopic tube is still usable, either by leaving in the collapsed position during use the two sections which cannot be locked to one another, or by locking them by inserting a pin externally. Moreover it is possible, when the partitions are located near the shoulders formed by the enlarged sleeves, to utilise said partitions for the purpose of limiting the closing movement, in that on collapsing the tube the inner end of each tube section strikes against the partitions of the surrounding section. With this method of limiting the closing movement the ends of the tubes can no longer impinge against the detent pins located in the enlarged sleeves, whereby the risk of knocking these pins out of their guides, is avoided.

The partitions may consist of discs or anuli, preferably of sheet metal, immovably secured in the sleeves. An advantageous construction consists in forming the partitions from the bottoms of cups inserted in the sleeves, and which likewise are preferably made of sheet metal. Further possible methods of carrying out the invention and advantages are set out in the following description.

Several embodiments of the invention are illustrated diagrammatically and by way of example in the accompanying drawing, wherein for the sake of simplicity only the continuous ends of two sections of a telescopic tube are shown in the extended position.

Figure 1:
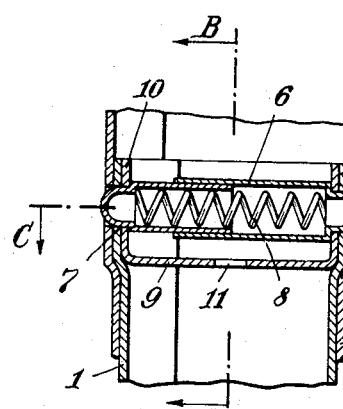
Fig. 1 is an axial section of the first example on the line A—A of Fig. 2.

1 and 2 are two tubular sections of a telescopic tube, for example a leg of a tripod stand, said tube consisting of a given number of telescopically collapsible sections. The inner ends 3 of the tube sections are in form of enlarged sleeves, in known manner, while the outer ends 4, on the other hand, are constricted. The sections are in this way slidable guided one within the other with a snug fit, whilst at the same time shoulders 5 are formed, which impinge against one another on pulling out the tube and thus limit the degree of extension. The sleeve-shaped ends 3 are provided with hollow pins 6 serving for the mutual locking in position of the tube sections, said pins being guided in closely fitting apertures 7 in the sleeve walls and being constrained outwardly by a spring 8. When the tube is extended the outer ends of the pins engage with holes in the surrounding tube, thereby securing the tube sections to one another.

Figure 2:
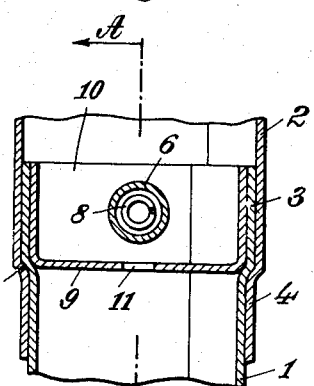
Fig. 2 is an axial section on the line B—B of Fig. 1.
Figure 3:
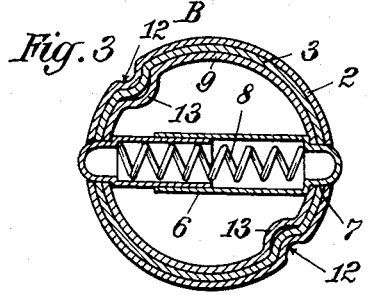
Fig. 3 is a cross section on the line C—C of the Fig. 1.

In the case of the embodiment according to Figs. 1 to 3, a cup-shaped partitioning means 9, 10 pressed or drawn from sheet metal is inserted as a close fit in each enlarged sleeve 3, and in such a manner that the disc-shaped portion 9 thereof is adjacent to the shoulder formed by the sleeve. The ring-shaped portion 10 of the cup, which terminates at the level of the rim of the sleeve 3, is provided with apertures corresponding to the apertures 7 in the sleeve wall for the passage of the detent pins 6. The cup 9, 10 is suitably secured in the enlarged end of the tube 3, for example, with one or two small rivets which are driven into holes in the walls of the cup and sleeve. Its bottom 9 forms a partition adjacent to the shoulder 5 and at right angles to the tube axis, which supports the walling of the sleeve 3 internally and stiffens it to such extent that it is not liable to bend inwards. At the same time the bottom 9 forms an abutment, against which the sleeved end 3 of the adjacent inner tube section impinges when the telescopic tube is closed up. The inner ends of the tubes therefore no longer strike against the detent pins 6, whereby the latter are protected against dislodgement from their guides. Moreover the bottom of the cup 9, 10 subdivides the interior of the telescopic tube into a plurality of chambers, each of which only contains one detent pin 6. Any pins dislodged can only move about in a space defined by the bottoms of two adjacent cups and cannot gain access to other parts of the telescopic tube. Furthermore the walling of the cup 9, 10 also strengthens and stiffens the rim of the enlarged sleeve 3, so that it cannot be buckled when it strikes against the bottom of the cup inserted in the adjacent outer tube. Finally, the wall 10 of the cup also forms an extension and therewith an improvement of the guide way for the detent pins 6.

In order that no reduced or excess pressure may be produced in the interior when extending or collapsing the telescopic tube, which would exert an unnecessary braking effect, the bottoms 9 of the cups 10 inserted in the enlarged portions 3 of the tube sections may be provided with air passages 11. Said passages 11 can be made more or less wide. It will be sufficient if the bottom of the cup or the partition 9 formed therefrom is left in the form of an annulus. Instead of being formed by apertures in the bottoms of the cups, air passages can also be formed by pressing longitudinal channels in the outside of the walls 10 of the sheet metal cups. If, as is assumed in the example, the sections of the telescopic tube are made with pressed longitudinal ridges and channels 12 for the purpose of ensuring non-rotational sliding—in which case the walls 10 of the cups 9, 10 must be provided with channels at the same place—the air passages may be provided by making the channels 13 in the walls of the cups deeper than is necessary for engaging with the ridges provided on the inside walls of the sleeves, so that in this case slit-shaped channels are formed, as can be seen from 13 in Fig. 3.

The cups 9, 10 can be fixed in the sleeves 3 by means than riveting, as is assumed in the example. For example, the rim of the sleeve, projecting beyond the edge of the cup, may be flanged inwardly thereover. In this case if desired, a disc or annulus may be inserted between the flanged edge and the edge of the cups 9, 10, which constitutes a second partition located at the edge of the sleeve. In some cases a special fixing may be dispensed with and each cup can be kept in position in the appropriate sleeve by the detent pins 6, which couple the cups 9, 10 with the sleeves 3 by virtue of the fact that their ends engage simultaneously in the holes in the walls of both parts. The example can also, if desired, be modified by inserting the cups 9, 10 in the inverted position, so that the partition formed by its base 9 is adjacent the edge of the sleeve.

Figure 4:
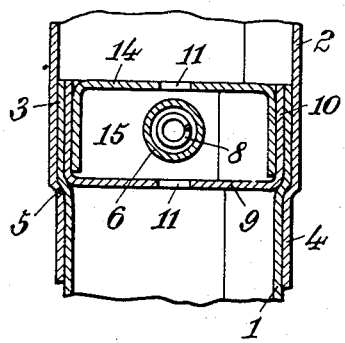

In the embodiment according to Fig. 4, each enlarged sleeve 3 contains two sheet metal cups 9, 10 and 14, 15, which are inserted into one another with facing open ends. The bottoms 9 and 14 of the two cups form two partitions, at right angles to the tube axis, of which one is located near the shoulder 5, the other on the contrary, being adjacent the rim of the sleeve. As will be apparent, this construction furnishes a very effective support and stiffening for the enlarged tubular sleeve 3. The advantage is also afforded that the two interengaging cups 9, 10 and 14, 15 constitute a casing surrounding the detent pins 6, which prevents the pins and their springs from being knocked out of their guides, so that any chance of failure is removed.

Figure 5:
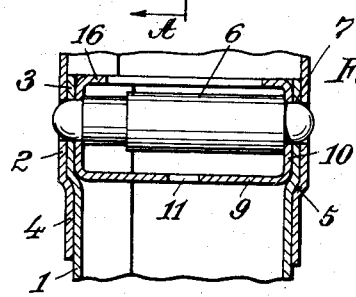
Figs. 4 to 6 are respectively an axial section of a second, third and fourth embodiment.

The same result as in the case of the embodiment of Fig. 4 can be achieved according to Fig. 5 by bending the edge of the ring portion 10 inwards in the form of a flange. The annular flange 16 then forms an auxiliary partition, whilst it also protects the detent pins from being knocked out of their guides. The sheet metal cups can be secured in the embodiments according to Figs. 4 and 5 in the same way as is described above with reference to the first example. A construction similar to that of Fig. 5 can also be achieved in the embodiments according to Figs. 1–3, by bending inwardly the walls of the tubular sleeve 3 in the form of a radial flange overhanging the rim of the cup.

Figure 6:
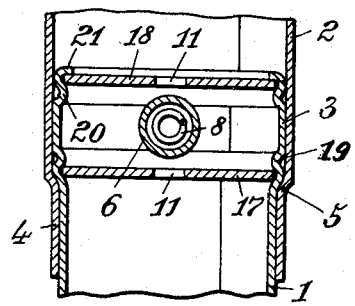

In the embodiment according to Fig. 6, the partitions serving to support and stiffen the enlarged sleeves 3 consist of simple sheet metal discs, which may also be provided with air passages 11, or may be in the form of annuli. In this case, two such discs 17 and 18 are provided in each sleeve; one (17) adjacent the shoulder 5 and the other (18) near the rim of the sleeve. The first disc is secured to between the inner shoulder surface of the enlarged sleeve 3 and a bead or the like 19 externally pressed into the wall of said sleeve; the second disc on the other hand is secured between a similar bead or the like 20 and the inwardly flanged edge 21 of the sleeve; the effect is the same as in the examples of Figs. 4 and 5.

The embodiment according to Fig. 6 may be modified by omitting the beads 19, 20 and inserting between the two metal discs 17, 18 a ring serving as a spacing member, which ring may consist of a short section of tube or may be bent from a metal strip. A further modification of the example may consist in only providing the partition adjacent the shoulder 5, the other being omitted. The remaining partition 17 may, as before, be secured between the inner shoulder surface of the tubular sleeve and a bead 19 pressed into the latter, or by means of a ring inserted into the sleeve behind the partition. In such case, this ring may be secured in the same way as the metal cup illustrated in Figs. 1 to 3. Conversely, one partition only may also be provided at the rim of the sleeve. The parition can as in the case of the partition 18 illustrated in Fig. 6 be retained in position by means of the bead 20 and the flange 21 or also solely by flanging the rim of the sleeve, if a spacing ring is inserted between the partition and the inner shoulder surface of the sleeve. It will be understood that any spacing rings used are to be provided with holes for the passage of the detent pins 6.

Various further modifications of the examples depicted and other modifications and applications are possible within the scope of the invention. Thus, the air passages could also be formed from peripheral notches in the partitions instead of holes. In such case the peripheral notches could, if desired, be of such shape that the partition was in the form of a spider or of a similar shape.

An advantageous embodiment also consists in inserting in each enlarged sleeve a ring, one or both edges of which in a similar manner to the edge 16 of the cup in Fig. 5, being bent inwardly in the form of an annular flange at right angles to the axis of the tube. Although it is preferable that the partitions or the cups as well as the rings securing the partitions should be made of metal and especially sheet metal, these members could also consist of any other sufficiently robust material, for example of a plastic material of suitable strength.

Finally, the detent pins and their springs may be constructed in a different manner from that shown in the drawing, or other locking devices may be provided for the tube sections.

The expression "tube" or "tube section" employed in the foregoing description and in the appended claims is not intended simply and solely to include cylindrical tubes with continuous walls, but also tubes of any other desired cross section customary in the construction of tripod stands and the like, such as for example, tubes of oval, triangular or similar cross section and also tubes having a longitudinal gap or slit, so-called profiled tripod stands for example, of C-shaped or similar cross section.

I claim:

1. A telescopic tube for tripods, comprising, in combination, at least one first tube section having a constricted end portion; at least one second tube section having an enlarged sleeve portion at one end thereof connected to the main portion of said second tube section by a shoulder, said second tube section being longitudinally movable in said first tube section with said enlarged sleeve portion slidingly engaging the inner surface of said first tube section to a position in which said shoulder abuts against said constricted portion; and partitioning means located in said enlarged sleeve portion and including a disc-shaped member abutting along the perimeter thereof against said shoulder so as to reinforce the same and to prevent compression of said sleeve portion by said constricted portion, said partitioning means being provided with opening means for the passage of air during relative movement of said first and second tube sections and being adapted to serve as an abutment for another tube section sliding into said second tube section.

2. A telescopic tube according to claim 1 wherein said partitioning means includes another disc-shaped member abutting against the inner surface of said enlarged sleeve portion adjacent to the rim of the same.

3. A telescopic tube for tripods, comprising, in combination, at least one first tube section having a constricted end portion; at least one second tube section having an enlarged sleeve portion at one end thereof connected to the main portion of said second tube section by a shoulder, said second tube section being longitudinally movable in said first tube section with said enlarged sleeve portion slidingly engaging the inner surface of said first tube section to a position in which said shoulder abuts against said constricted portion; and partitioning means located in said enlarged sleeve portion and including a cup-shaped hollow member, having a transversal disc-shaped bottom wall abutting along the perimeter thereof against said shoulder so as to reinforce the same and to prevent compression of said sleeve portion by said constricted portion, said disc-shaped bottom wall being provided with opening means for the passage of air during relative movement of said first and second tube sections, said cup-shaped hollow member also having a cylindrical wall abutting against the inner surface of said sleeve portion, said partitioning means being adapted to serve as an abutment for another tube section sliding into said second tube section.

4. A telescopic tube according to claim 3 and including a transversal disc located adjacent to and abutting against the rim of said cup-shaped hollow member.

5. A telescopic tube according to claim 3 wherein said cylindrical wall is inwardly bent at the rim thereof to form an inwardly extending flange.

6. A telescopic tube according to claim 3 and including another cup-shaped hollow member located in said first-mentioned cup-shaped hollow member and having a transversal bottom wall located adjacent to the rim of said cylindrical wall of said first-mentioned cup-shaped hollow member.

7. A telescopic tube according to claim 1 wherein said enlarged sleeve portion is provided with an inwardly extending flange at the rim thereof, and wherein said partitioning means includes another disc-shaped member abutting against the inner surface of said sleeve member adjacent said inwardly extending flange.

8. A telescopic tube acocrding to claim 3 wherein said first tube section, said sleeve portion and said cylindrical wall of said cup-shaped member are provided with aligned, diametrically arranged holes, and including a detent means diametrically extending through the telescopic tube and resiliently yieldably engaging the edges of said aligned holes.

9. A telescopic tube according to claim 1 wherein said sleeve portion is formed with an inwardly projecting annular bead portion abutting against said disc and holding the same in engagement with said shoulder.

10. A telescopic tube according to claim 1 wherein said partitioning means includes a disc located adjacent to the rim of said sleeve portion and wherein said sleeve portion is provided with an inwardly extending flange along the rim thereof and with two spaced inwardly projecting annular beads holding said disc-shaped member in engagement with said shoulder and said disc in engagement with said inwardly extending flange.

11. A telescopic tube according to claim 3 wherein axially extending channels are formed in the outer surface of said cylindrical wall of said cup-shaped member, said channel permitting passage of air.

12. A telescopic tube according to claim 3 wherein said cup-shaped member and said sleeve portion are formed with cooperating channels and ridges for preventing relative turning movement therebetween.

References Cited in the file of this patent

UNITED STATES PATENTS

| | | |
|---|---|---|
| 713,794 | Osterman | Nov. 18, 1902 |
| 2,273,791 | Wirgin | Feb. 17, 1942 |
| 2,319,992 | Hubbard | May 25, 1943 |
| 2,461,915 | Neuwirth | Feb. 15, 1949 |
| 2,550,415 | Kammermeyer | Apr. 24, 1951 |

FOREIGN PATENTS

| | | |
|---|---|---|
| 570,082 | Germany | June 30, 1933 |